United States Patent
Fink

[15] 3,672,620

[45] June 27, 1972

[54] HEIGHT GAUGE

[72] Inventor: Anton Fink, 149 Crescent Drive, Albertson, N.Y. 10000

[22] Filed: Nov. 17, 1970

[21] Appl. No.: 90,324

[52] U.S. Cl. ......................................................248/125
[51] Int. Cl. ...............................................F16m 11/04
[58] Field of Search ..........................248/124, 125; 350/255

[56] References Cited

UNITED STATES PATENTS

| | | | |
|---|---|---|---|
| 2,469,904 | 5/1949 | Szuba | 248/124 |
| 2,677,519 | 5/1954 | Hobson | 248/125 |
| 3,362,668 | 1/1968 | Reinhart | 248/125 |

Primary Examiner—William H. Schultz
Attorney—Leonard H. King

[57] ABSTRACT

A centrally located shaft, having a longitudinal groove therein, is provided with an arm extending outward of the tubular casing for supporting either an electronic or a mechanical sensor. A coarse adjustment for a rapid movement of the arm and the sensor is provided as well as a fine adjustment which includes spring means for supporting the upper and lower ends of the shaft and a threaded, axially movable screw that is driven through a pulley system by means of the fine adjustment knob.

The aforementioned abstract is neither intended to define the invention of the application which, of course, is measured by the claims, nor is it intended to be limiting as to the scope of the invention in any way.

12 Claims, 5 Drawing Figures

PATENTED JUN 27 1972
3,672,620
SHEET 1 OF 2
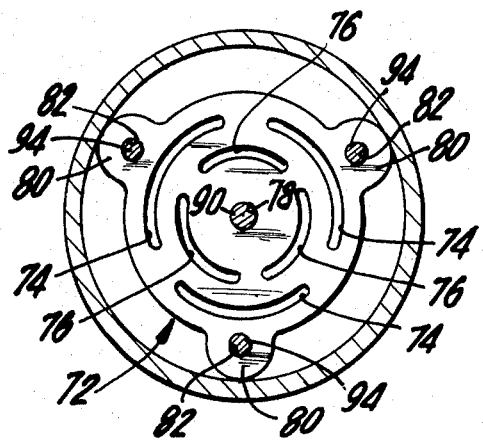
FIG. 3
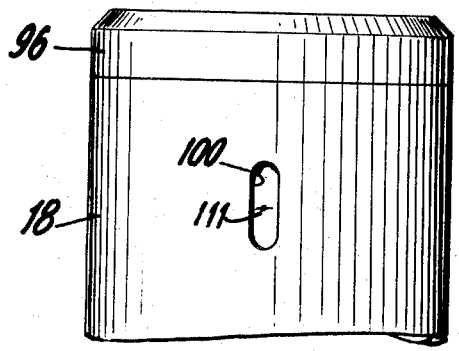
FIG. 5
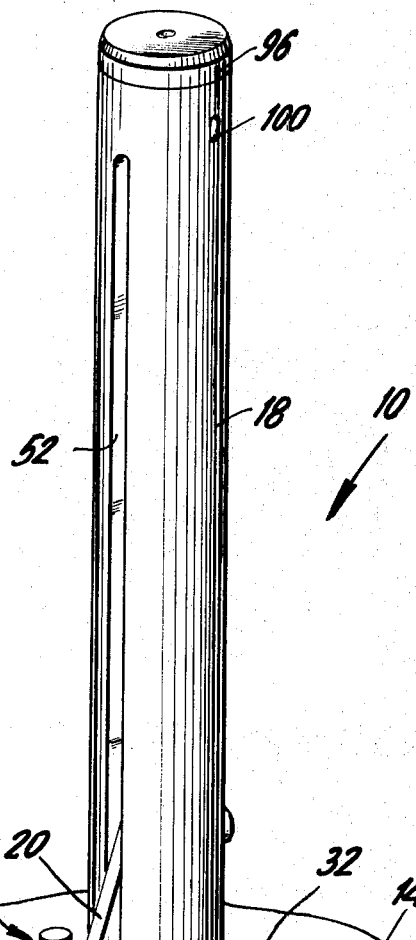
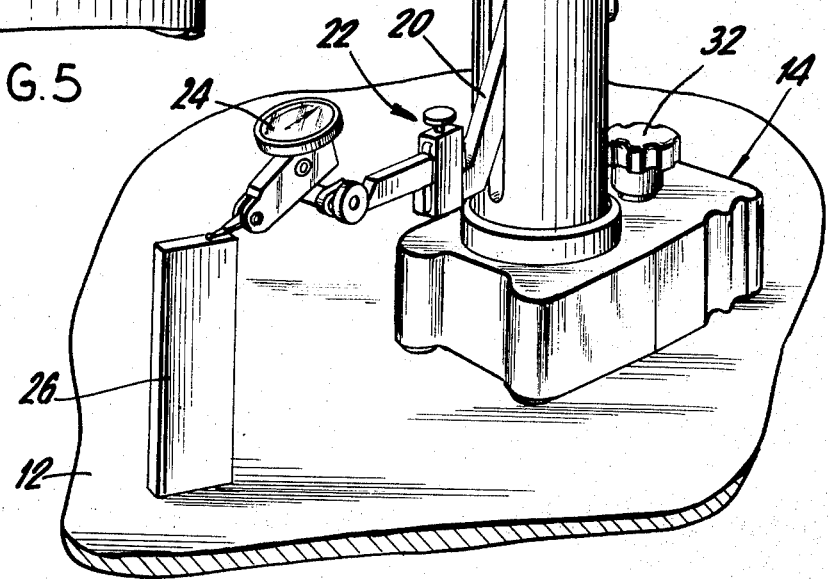
FIG. 1
INVENTOR.
ANTON FINK
BY
Leonard H. King
ATTORNEY

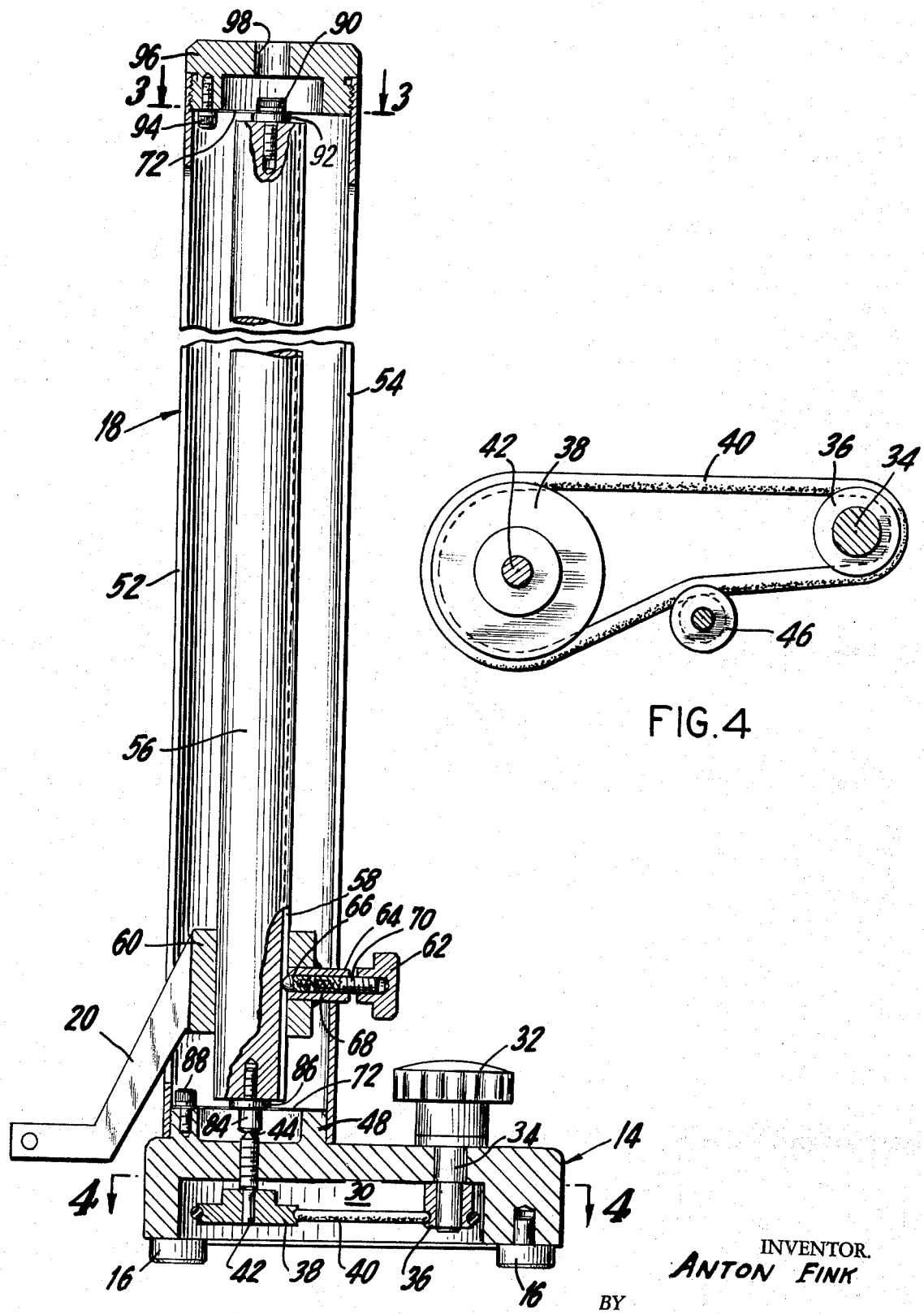

HEIGHT GAUGE

This invention relates generally to measuring devices and more particularly to an improved height transfer gauge.

BACKGROUND OF THE INVENTION

In the past, height transfer gauges relied primarily on a threaded, central shaft or column for axially moving a sensor attached thereto. The accuracy or closeness of tolerance of the mating threads was a prime factor in determining the precision of the device. To provide a higher degree of accuracy, it was necessary to provide costly structure for moving the sensor mounting arm. Where threads were used for this purpose, the life of the instrument was limited to the life of the threads. That is, when the threads showed signs of wear, the instrument would lose accuracy and replacements were necessary.

The present invention overcomes the shortcomings of the prior art by completely eliminating the need for any threaded column that is used to support the sensor mounting arm. Instead, the present invention provides means for a first, coarse adjustment of the sensor mounting arm and also a second, fine adjustment thereof which is provided by a screw bearing against the spring loaded central shaft that supports the sensor arm. The fine adjustment knob acts through a belt and pulley system to provide a mechanical advantage. Each single revolution of the fine adjusting knob provides for a very small displacement of the central shaft through a spring support system.

Thus a highly sensitive device is provided which permits gauge settings to millionths of an inch. There is no drifting and no backlash. A single spring loaded locking screw permits rapid preliminary positioning for coarse adjustment and three hardened and lapped base pads, allow a smooth, vibration free gliding on a surface plate. The device has a low center of gravity to permit a high degree of stability and the central column is protected by a sleeve or outer tubing that prevents any possible damage or expansion error due to body heat.

Accordingly, the primary object of the present invention is to provide an improved height transfer gauge.

Another object of the present invention is to provide an improved height transfer gauge that does not require the use of any central actuating screw for coarse adjustment.

A particular object of the present invention is to provide an improved fine adjustment for a height transfer gauge.

A feature of the present invention is that the central sensor mounting shaft is spring supported.

An advantage of the present invention is that the fine adjustment knob provides a mechanical advantage for the minute movement of the sensor supporting arm.

These and other objects, features and advantages of the invention will, in part, be pointed out with particularity, and will, in part, become obvious from the following more detailed description of the invention, taken in conjunction with the accompanying drawing, which forms an integral part thereof.

In the various figures of the drawing like reference characters designate like parts.

BRIEF DESCRIPTION OF THE DRAWING

FIG. 1 is a perspective view illustrating the present invention in its particular environment;

FIG. 2 is a sectional elevational view partially broken away, of the present invention;

FIG. 3 is a transverse sectional view taken along line 3—of FIG. 2;

FIG. 4 is another transverse sectional view taken along line 4—4 of FIG. 2 with portions omitted for clarity; and FIG. 5 is a fragmentary elevational view of the upper portion of the structure comprising the present invention.

The environment of the present invention may best be appreciated by reference to FIG. 1. The height transfer gauge 10 is positioned on a surface plate 12. In order to allow smooth and vibration free movement of the height gauge 10, the base portion 14 thereof is provided with three hardened and lapped base pads 16 (FIG. 2). The height gauge 10 is further comprised of a tubular column 18 that is mounted on the base 14 and which supports an outwardly extending arm 20. A clamping assembly generally designated by the reference character 22 is used to couple an indicator 24 to the arm 20. A typical gauge block 26 is shown in FIG. 1. The indicator 24 may be set or adjusted using a gauge block 26 of known dimension.

Turning now to FIG. 2, it will be seen that the base plate 14 is provided with a recess 30 in which the actuating means for the fine adjustment is positioned. The fine adjustment is comprised of a knob 32 having an integral shaft 34 that is journalled in the base plate 14. A first pulley 36 is mounted on the shaft 34. A second pulley 38 that is coupled to the first pulley 36 by means of a belt such as an O-ring 40 is mounted on a shaft 42 that is threaded into the base plate 14. The shaft 42 extends through the base plate and terminates thereabove in a spherical member such as a ball 44. An idler pulley 48 (FIG. 4) is also journalled in the base plate 14 and bears against the pulley belt 40 for tensioning purposes. Finally, the upper surface of the base plate 14 is provided with a circular boss 48 whose function will be described hereinafter.

The tubular column 18 has elongated slots 52 and 54 formed in the wall thereof and is mounted on the boss 48. The column 18 encloses a central shaft 56 having an elongated, axially extending groove 58 formed in the surface thereof. A hub 60, integral with the arm 20, is used to mount the arm 20 on the shaft 56. For this purpose, a spring loaded, coarse adjustment knob 62 is provided. As shown in FIG. 2, the hub 60 has a hollow projection 64 welded thereto. A pin 66 is positioned within the projection 64 so as to engage the groove 58 formed in the shaft 56.

A spring 68 extends between the pin 66 and a shaft 70 that is threaded into both the projection 64 and the coarse adjustment knob 62. When the shaft 70 is backed off by rotating the coarse adjustment knob 62, the spring force exerted against the pin 66, and hence against the shaft groove 58, is reduced so that the arm 20 may be removed rapidly either up or down. When the arm 22 is close to its proper position as shown by the indicator 24 it is locked in place by rotating the coarse adjustment knob so as to exert a greater spring force against the pin 66 and, therefore, against the shaft 56. The arm 20 extends through the elongated slot 52 and the projection 64 extends through the elongated slot 54, both of which are formed in the wall of the column 18.

Upper and lower spring means 72, such as shown in FIG. 3, resiliently support the shaft 56. The spring means 72 are both in the form of a leaf having a plurality of arcuate slots 74 on a first diameter and a second plurality of arcuate slots 76 on a second diameter. There is a central opening 78 and three equally spaced tabs 80 each having an aperture 82.

The lowest spring means 72 is secured to the shaft 56 by means of a screw 84 and a washer 86. The head of the screw 84 is in coaxial abutment with the ball 44. Screws 88 that pass through the apertures 82 are used to secure the tabs 80 to the boss 48 formed on the base plate 14.

At the upper end of the height transfer gauge the spring means 72 is secured to the shaft 56 by means of a screw 90 and a washer 92. Screws 94 pass through apertures 82 in the tabs 80 in order to secure the upper spring means 72 to a plug 96 that is threadably secured to the upper end of the column 18. A central opening 98 in the plug 96 is used for access to the screw 90.

The upper end of the tubular column 18 is provided with a small, elongated opening 100 that is used for visual determination of that indicia mark 111 is centered in the opening before beginning adjustment.

The length of opening 100 corresponds to the limit of travel of member 56. This prevents the user from finding that he lacks adjustment range during a measurement operation.

Once the arm 20 has been moved by the coarse adjustment described hereinabove, the fine adjustment knob is used for a precise location of the indicator mechanism. Each single revolution of the knob 32 provides a fine adjustment of 0.006 inches and this is equivalent to a 166 pitch screw. As the knob 32 is rotated, the pulleys 36 and 38 are driven through the belt 40. The screw 42 is thereby moved axially, either upwardly or downwardly, depending upon the direction of rotation of the knob 32 and, since the ball 44 bears against the head of the screw 84, the shaft 56 will be moved axially thereby. The upper and lower spring means 72 control the axial movement of the shaft 56. Thus when the screw 42 moves axially, the spring means 72 will be deflected. The slots 74 in each of the spring means 72 provides for greater flexibility thereof.

From the foregoing it will be appreciated that an improved height transfer gauge has been provided. The conventional screw threads used heretofore are no longer necessary since the fine adjustment knob, through the pulley system and spring support means, provides for minute axial displacement of the shaft that carries the sensor supporting arm. The coarse adjustment means that couples the shaft supporting arm to the central shaft permits rapid movement of the indicator gauge at all other times.

There has been disclosed heretofore the best embodiment of the invention presently contemplated. However, it is to be understood that various changes and modifications may be made thereto without departing from the spirit of the invention.

What I claim as new and desire to secure by Letters Patent is:

1. An improved height transfer gauge comprising the combination of:
   a. a base plate;
   b. a tubular column mounted on said base plate, said column having at least one axially extending elongated slot formed in the wall thereof;
   c. a shaft positioned within said column;
   d. spring means for resiliently supporting said shaft;
   e. indicator support means mounted on said shaft for axial movement with respect thereto, said indicator support means extending outwardly in said column through said slot; and
   f. fine adjustment means for axially displacing said shaft and thereby biasing said spring means.

2. The height transfer gauge in accordance with claim 1 wherein said spring means comprises upper and lower leaves, said lower leaf being secured to said shaft and said base plate, said upper leaf being secured to said shaft and said column.

3. The height gauge in accordance with claim 2 wherein said spring means is a disc having at least one plurality of arcuate slots formed therein on a first diameter.

4. The height transfer gauge in accordance with claim 3 wherein said spring means further includes a second plurality of arcuate slots formed on a second diameter.

5. The height transfer gauge in accordance with claim 1 wherein said fine adjustment means comprises a screw threaded into said base plate whereby one end thereof is in abutment with one end of said shaft and means for axially displacing said screw.

6. The height transfer gauge in accordance with claim 5 including a ball at the end of said screw that is in abutment with said shaft.

7. The height transfer gauge in accordance with claim 5 wherein said screw displacement means comprises a first pulley mounted on said screw, a knob having a shaft journalled in said base plate, a second pulley mounted on said shaft and a belt trained about said first and said second pulleys.

8. The height transfer gauge in accordance with claim 7 wherein said first and said second pulleys are of different diameters for providing a mechanical advantage.

9. The height transfer gauge in accordance with claim 7 further including means for tensioning said belt.

10. The height transfer gauge in accordance with claim 1 wherein there is further included coarse adjustment means for sliding said indicator support means along said shaft.

11. The height transfer gauge in accordance with claim 10 wherein said coarse adjustment means comprises a second, axially extending slot formed in the wall of the said column, an elongated, axially extending groove formed in said shaft and clamping means in engagement with said groove and said indicator support means, said clamping means extending through said second slot whereby said indicator support means may be moved axially with respect to said shaft and then clamped thereto.

12. The height transfer gauge in accordance with claim 11 wherein said clamping means comprises a hollow projection secured to said indicator support means, a pin slidably positioned in said projection and in said groove, spring means in said projection for applying a force against said pin, a screw threaded in said projection in abutment with said spring means and a knob positioned externally of said column and secured to said screw.

* * * * *